(12) United States Patent
Linnell (10) Patent No.: US 7,600,070 B1
(45) Date of Patent: Oct. 6, 2009

(54) DISK DRIVE PACKAGING ENCLOSURE

(76) Inventor: Thomas E. Linnell, 9 Bridle Path Rd., Northborough, MA (US) 01532

( * ) Notice: Subject to any disclaimer, the term of this patent is extended or adjusted under 35 U.S.C. 154(b) by 473 days.

(21) Appl. No.: 11/277,958

(22) Filed: Mar. 30, 2006

(51) Int. Cl.
*G06F 13/00* (2006.01)

(52) U.S. Cl. .................. 710/316; 710/2; 711/114
(58) Field of Classification Search .................. 711/100, 711/147, 114; 710/2–5, 316–317; 370/351
See application file for complete search history.

(56) References Cited

U.S. PATENT DOCUMENTS 7,353,321 B2 * 4/2008 Steinmetz et al. ........... 711/100

* cited by examiner

*Primary Examiner*—Clifford H Knoll (57) ABSTRACT

An arrangement of a plurality of disk drives having a interconnect control card and a plurality of disk drive carriers. The interconnect control card includes a plurality of serial interconnects; each one of the serial interconnects comprising a plurality of serially connected switches. Each one of such disk drive carriers has thereon a different portion of the plurality disk drives. The disk drives on each one of the carriers are connected to the switches in a different one of the plurality of serial interconnects. The disk drives on different ones of the carriers provide a RAID group.

12 Claims, 8 Drawing Sheets

DISK DRIVE PACKAGING ENCLOSURE

TECHNICAL FIELD

This invention relates generally to disk drive packaging enclosures and more particularly to disk drive packaging enclosures for RAID systems.

BACKGROUND

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As is also known in the art, the interface is typically stored in a cabinet such as described in U.S. Pat. No. 6,914,784 issued Jul. 5, 2005 entitled Data Storage System Cabinet, inventors Chilton et al., assigned to the same assignee as the present invention. As described therein, the cabinet having a plurality of rack mountable chassis. One portion of such chassis has directors and electrically interconnected memory and another portion of such chassis has a plurality of disk drives. The chassis are electrically interconnected to provide the data storage system interface. A first set of the chassis includes a memory and a plurality of directors and a second set of the chassis include the disk drives. The disk drive chassis, which includes an M×N array of disk drives, where M represents the columns, and N represents the rows of the array, have typically been arranged in one of a pair of configurations. A common topology in which the disk drives are interconnected is through a serial interconnect, such as for example a fibre-channel loop, switched-loop, SAS or serial-ATA point-to-point connection. The serial interconnect provides the necessary connection between the host disk controller and the individual disk drives within the disk drive chassis and includes an interconnect control card. The interconnect control card includes associated circuitry that provides the interconnect and includes, but is not limited to: a daisy-chained series of port-bypass circuits (PBC's) in the case of a fibre-channel arbitrated loop; a crossbar-type switch interconnect for making a direct connection between the storage controller and the disk drive in the case of a fibre-channel switched-loop; or a series of one or more expander-type switches in the case of a Serial Attached SCSI (SAS) or a serial-ATA point-to-point network.

One fibre channel loop is described in U.S. Pat. No. 6,571,355, inventor Thomas Linnell, entitled Fibre Channel Data Storage System Fail Over System, issued May 27, 2003, assigned to the same assignee as the present invention, incorporated herein by reference.

Figure 1A:
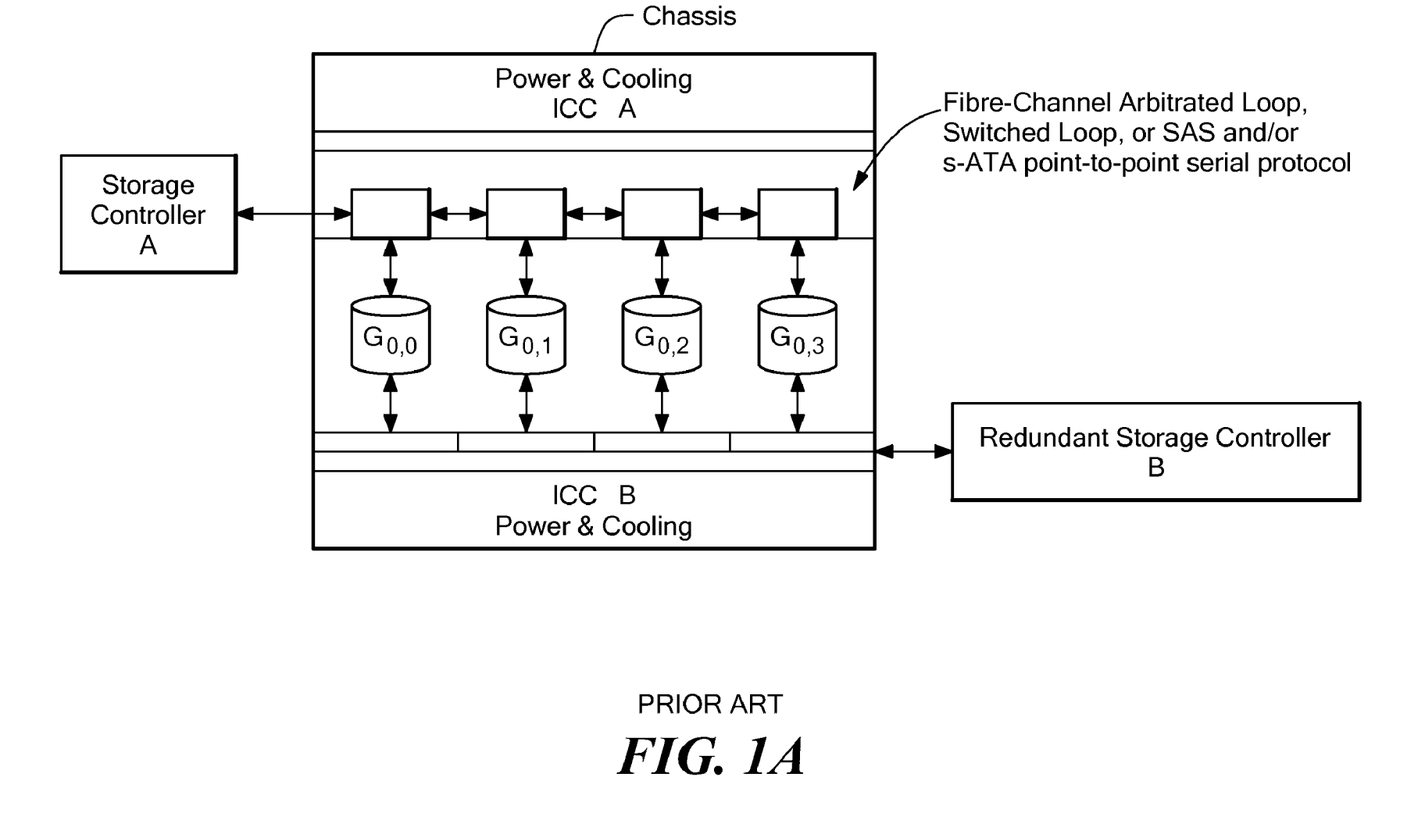
FIGS. 1A, 1B and 1C are diagrams showing a disk drive arrangement in accordance with the PRIOR ART.
Figure 1B:
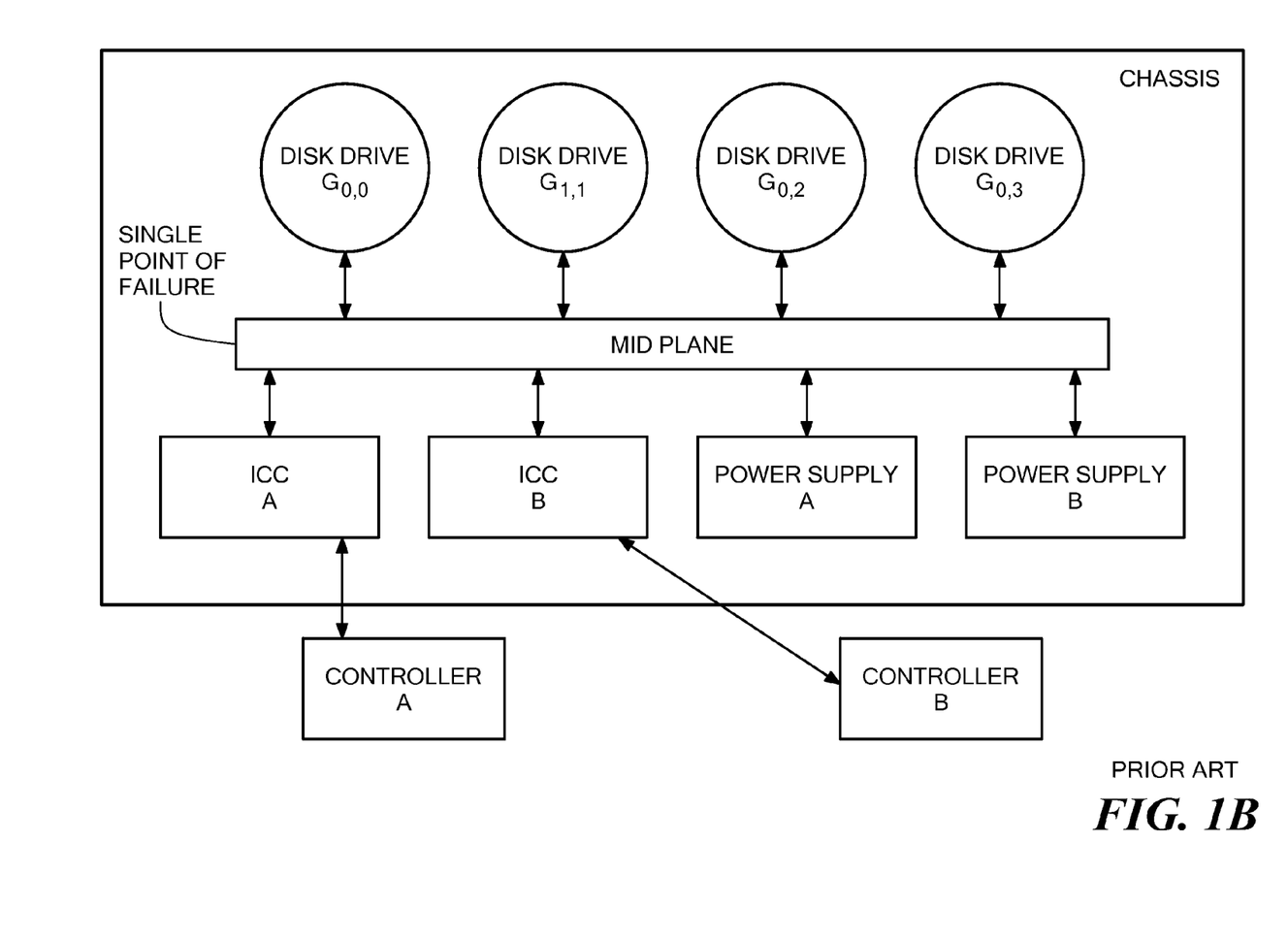
Figure 1C:
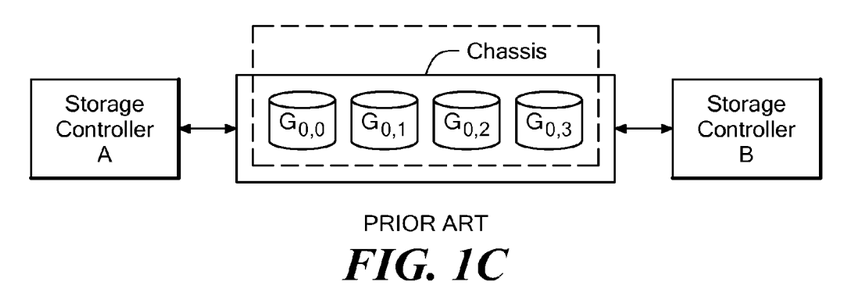
Figure 2A:
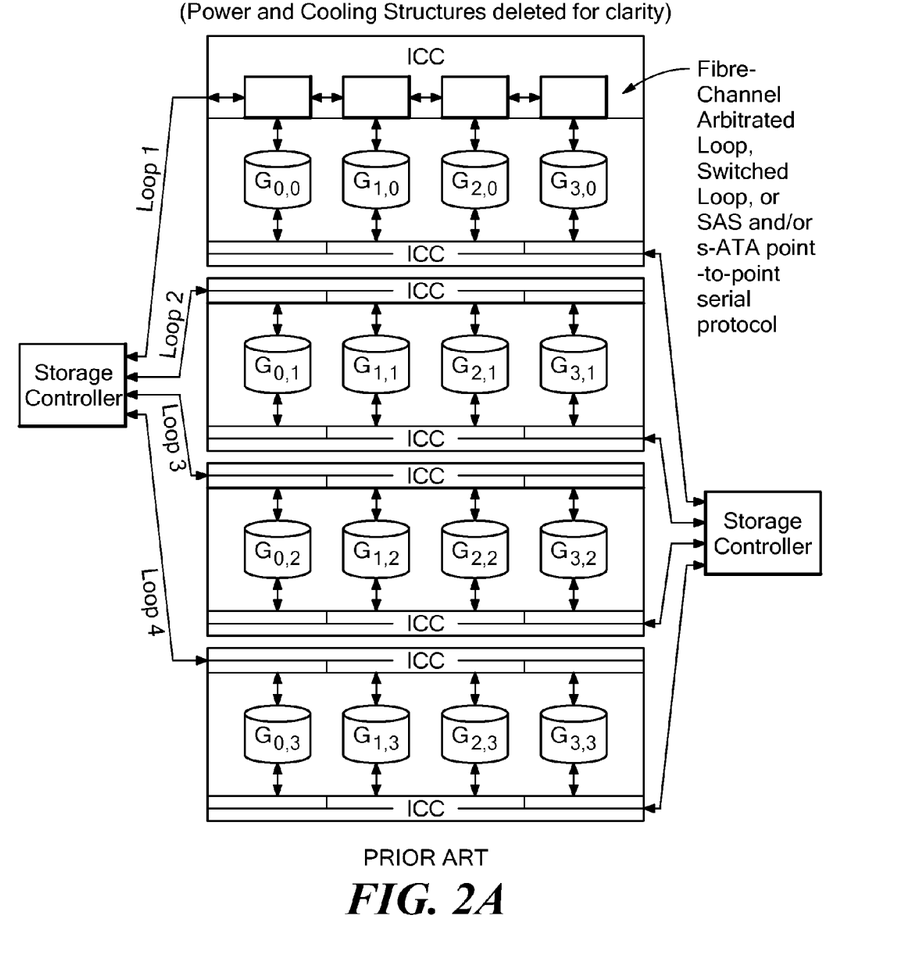
FIGS. 2A, 2B and 2C are diagrams showing a disk drive arrangement in accordance with the PRIOR ART.
Figure 2B:
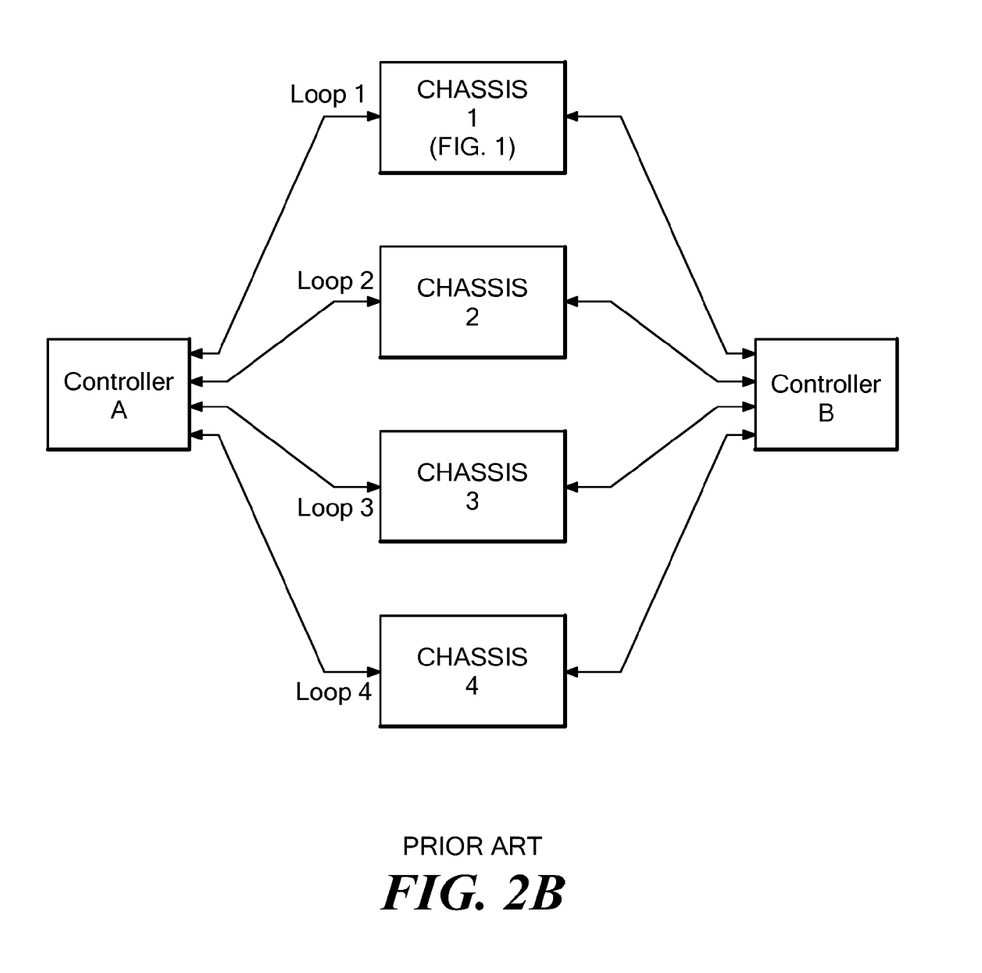
Figure 2C:
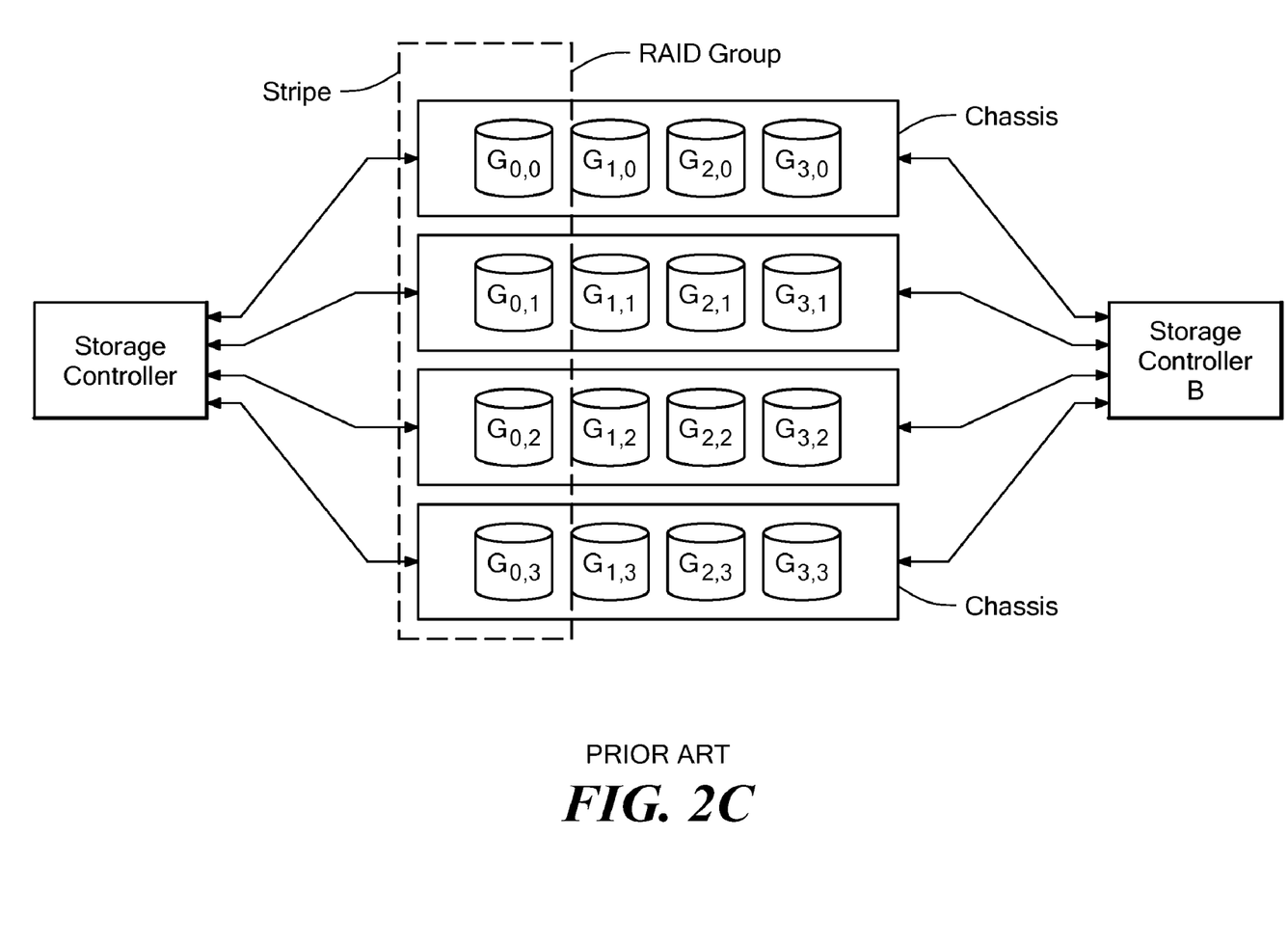

In one configuration, a RAID group is organized within a single column M, where members of the RAID group are located at various points along the N dimension. These are typically placed within a single chassis, although they may span different chassis. In high-availability designs, the disk drives are connected to two separate pathways to controllers via a single, shared, or common, backplane or midplane, as shown in FIGS. 1A, 1B and 1C where the disk drives plug into one side of the midplane and the LCC, including power and cooling units, plug into the opposite side of the midplane. This midplane therefore represents a single point of failure for the RAID group. To alleviate this problem, designers have resorted to striping members of the RAID set (herein sometimes referred to as a RAID group), across multiple M channels, as shown in FIGS. 2A, 2B and 2C each with a separate disk drive enclosure and midplane, each bit of each word of data, plus Error Detection and Correction (EDC) bits for each word, being stored on separate disk drives within a different one of the chassis, as indicted. This eliminates the single point of failure, however, it requires that all of the hardware be replicated M times 2 in order to create a high-availability system. To make each chassis less costly on a per drive basis, the number of disk drives is maximized—which leads to high impact failures if a midplane fails—since a member of many different RAID groups is affected (N), thereby exposing more of the system to additional independent faults that could cause an outage.

SUMMARY

In accordance with the present invention, an arrangement of a plurality of disk drives is provided having an interconnect control card and a plurality of disk drive carriers. The interconnect control card includes a plurality of serial interconnects; each one of the serial interconnects comprising a plurality of serially connected switches. Each one of such disk drive carriers has thereon a different portion of the plurality disk drives. The disk drives on each one of the carriers are connected to the switches in a different one of the plurality of serial interconnects.

In one embodiment, disk drives on different ones of the carriers provide a RAID group.

In one embodiment, each one of such switches has a disk drive port each one of the interconnect control card ports being connected to the disk drive port of a corresponding one of the switches. Each one of the carriers has a plurality of carrier ports, each one of the plurality of carrier ports being connected to a corresponding one of the interconnect control card ports.

In one embodiment, an arrangement of a plurality of disk drives is provided having a first interconnect control card, a second interconnect control card and a plurality of disk carriers. The first interconnect control card has a plurality of first serial interconnects, each one of the first serial interconnects comprising a plurality of serially connected first switches and the second interconnect control card has a plurality of second serial interconnects, each one of the second serial interconnects comprising a plurality of serially connected second switches. Each one of such disk drive carriers has thereon a different portion of the plurality disk drives. The disk drives on each one of the carriers are connected to the switches in a different one of the plurality of first serial interconnects and in a different one of the plurality of second serial interconnects.

With such an arrangement, the constraint of a shared, single midplane from a single enclosure that houses an M×N array is removed. This allows for the efficiency in cost and reduction in parts count that comes from consolidation of the replicated hardware (vis-à-vis the independent M chassis of N drives each). By eliminating the common failure point, the subsystem becomes completely field repairable, and becomes in essence a non-stop always-available unit. The way that this is accomplished is by organizing the disks along the N row on a common disk drive carrier. This carrier carries M (the number of columns) disks. This creates N independent hardware groups M different ways, which allows for greater independence of organizing RAID groups with members placed in distinct hardware groups. The disks may either be field replaceable on the carrier in situ, or the carrier may be removed from the system in order to repair the disk. There is circuitry that is contained on the common carrier that is used to control the disk drives, and to manage aspects of their behavior, circuitry that previously was relegated to each individual disk drive, so a commensurate M-level of reduction in this circuitry is also enabled. Finally, the elimination of the midplane allows for more effective front-to-back cooling of the drives and their associated electronics. Connection of the carriers is made directly to the control electronics cards through N connections.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3A:
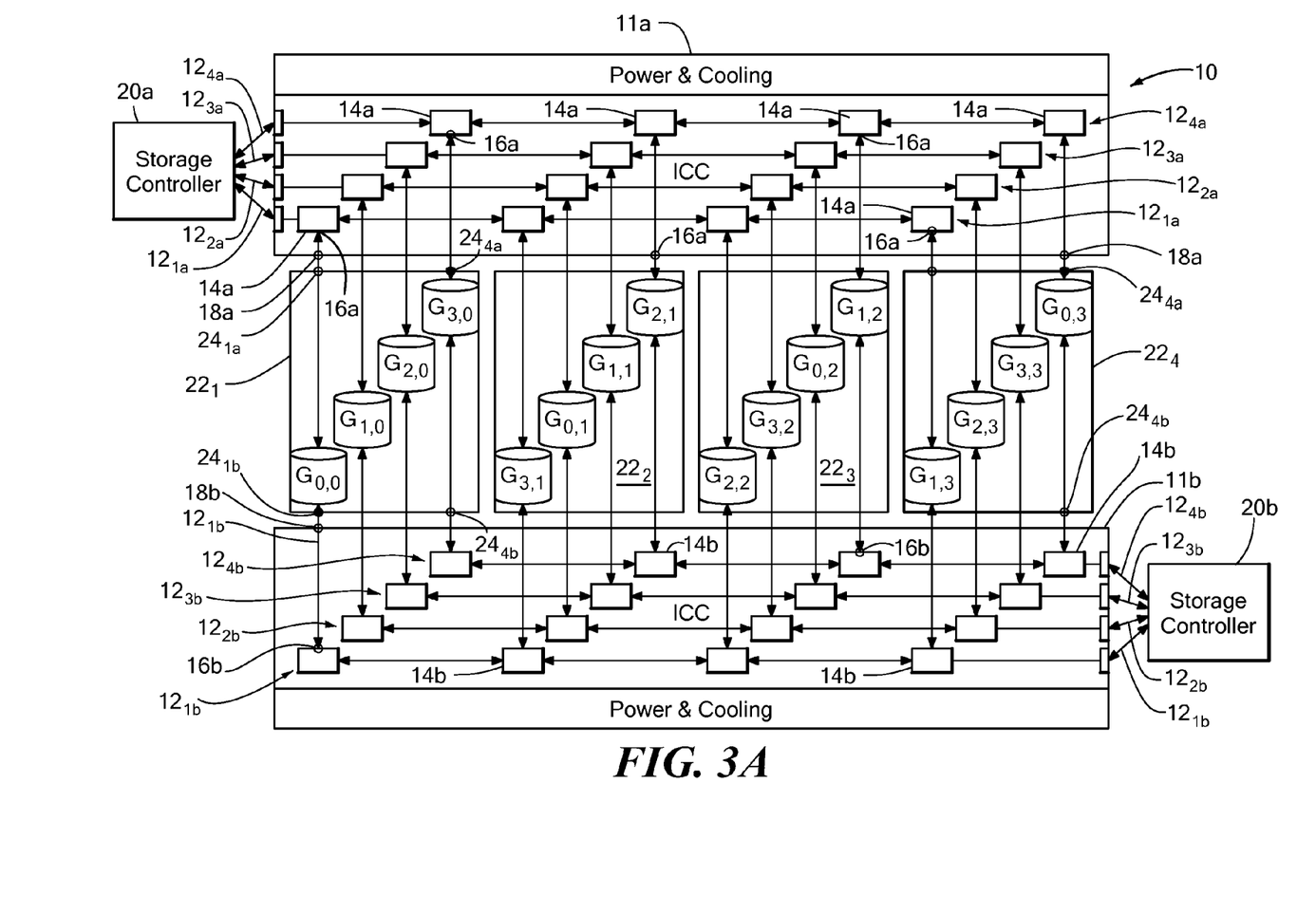
FIG. 3A is a diagram of showing a disk drive arrangement in accordance with the invention.

Referring now to FIG. 3A, an arrangement 10 of a plurality of disk drives $G_{0,0}$ through $G_{3,3}$, is shown. The arrangement 10 includes a first interconnect control card (ICC) 11a having: a plurality of first serial interconnects, here four serial interconnects $12_{1a}$ through $12_{4a}$. Each one of the first serial interconnects $12_{1a}$ through $12_{4a}$ has a plurality of serially connected first switches 14a. Each one of such first switches 14a has a first disk drive port 16a. The first interconnect control card 11a includes a plurality of first interconnect control card ports 18a, each one of the first interconnect control card ports 18a being connected to the first disk drive port 16a of a corresponding one of the first switches 14. Each one of the serial interconnects $12_{1a}$ through $12_{4a}$ is connected to a first storage controller 20a, as shown. Each one of the serial interconnects $12_{1a}$ through $12_{4a}$ in which the disk drives are interconnected is here a serial interconnect such as a fibre channel loop, switched loop, SAS, and/or an s-ATA point-to-point serial connection. The data traverses the serial interconnect uni-directionally and from one disk drive to the next in a daisy-chain fashion under the control of the interconnect (ICC) here having as switches 14a, port by-pass control (PBC) or serial interconnect switch circuitry, or is connected directly between the storage controller and the disk drive through the use of one or more expander switches.

A second interconnect control card (ICC) 11b is provided having: a plurality of second serial interconnects $12_{1b}$ through $12_{4b}$, each one of the second serial interconnects $12_{1b}$ through $12_{4b}$ having a plurality of serially connected second switches 14b. Each one of such second switches 14b has a second disk drive port 16b. The second interconnect control card 12b includes a plurality of second interconnect control card ports 18b, each one of the second interconnect control card ports 18b being connected to the second disk drive port 16b of a corresponding one of the second switches 14b. Each one of the second serial interconnects $12_{1b}$ through $12_{4b}$ is connected to a second storage controller 20b, as shown. The serial interconnect in which the disk drives are interconnected is here a fibre channel loop, switched loop, SAS, and/or s-ATA point-to-point serial connection. The data traverses the serial interconnect uni-directionally and from one disk drive to the next in a daisy-chain fashion under the control of the interconnect control card (ICC) here having as switches 14b, port by-pass control (PBC) or loop switch circuitry, or is connected directly between the storage controller and the disk drive through the use of one or more expander switches.

The arrangement 10 includes a plurality of, here four, disk drive carriers $22_1$ through $22_4$. Each one of the disk drive carriers $22_1$ through $22_4$ has thereon a different portion of the plurality disk drives $G_{0,0}$ through $G_{3,3}$, and a plurality of two sets of here four, carrier ports $24_{1a}$ through $24_{4a}$ and $24_{1b}$ through $24_{4b}$, respectively, as shown. Each one of the plurality of carrier ports $24_{1a}$ through $24_{4a}$ is connected to a corresponding one of the first interconnect control card ports $18_a$ and each one of the plurality of carrier ports $24_{1b}$ through $24_{4b}$ is connected to a corresponding one of the second interconnect control card ports $18_b$. The carrier ports $24_{1a}$ through $24_{4a}$ on each one of the carriers $22_1$-$22_4$ are connected to the first disk drive ports 16a connected to the first switches 14a in a different one of the first serial interconnects $12_1$-$12_4$ and to the second disk drive ports $24_{1b}$ through $24_{4b}$ connected to the second switches 14b in a different one of the second serial interconnects $12_{1b}$-$12_{4b}$.

Figure 3B:
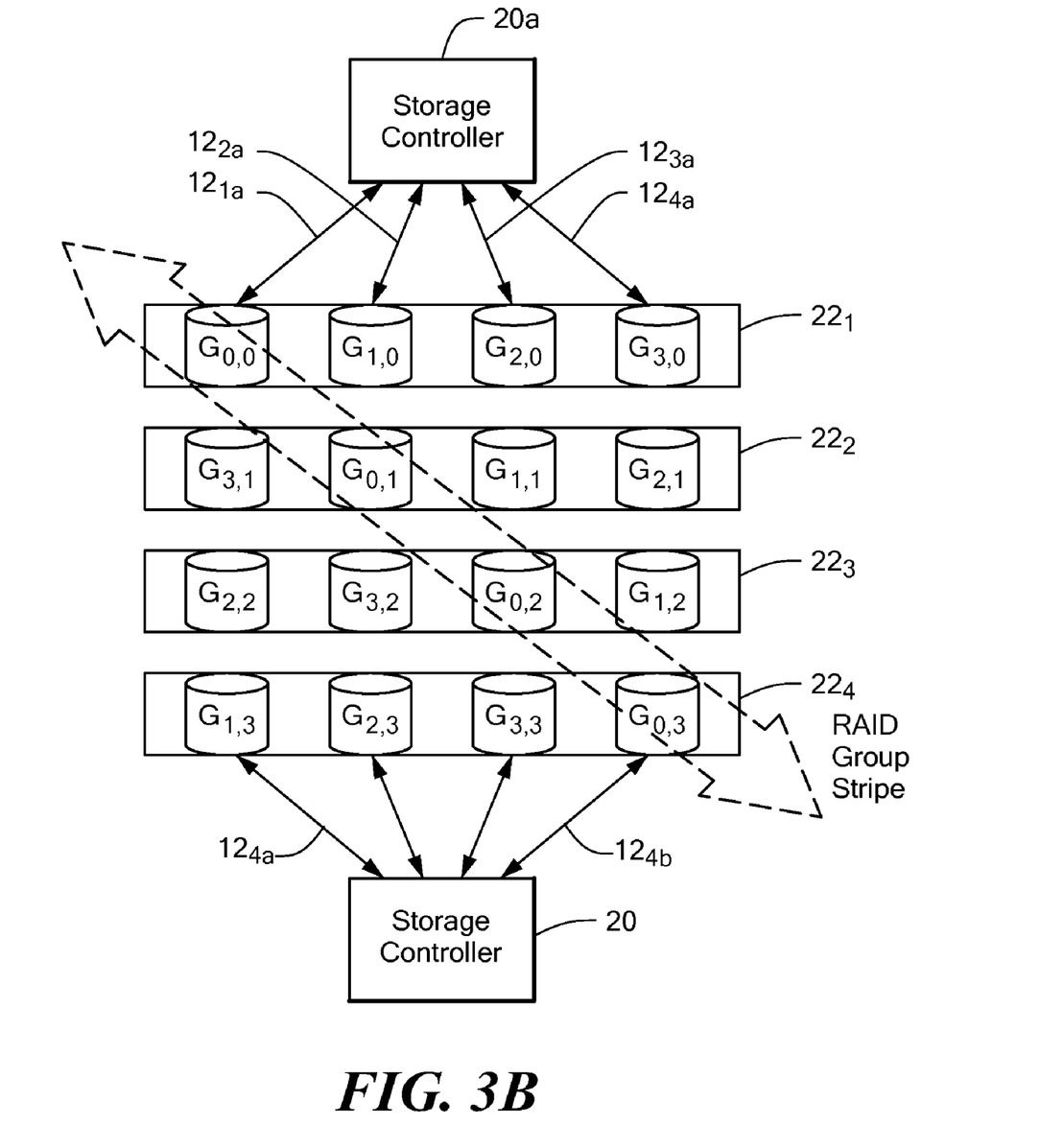
FIG. 3B is a diagram showing a RAID group with the arrangement of FIG. 3A.

Disk drives on different ones of the carriers provide a RAID group. More particularly, carrier $22_1$ carries disk drives $G_{0,0}$, $G_{1,0}$, $G_{2,0}$, and $G_{3,0}$; carrier $22_2$ carries disk drives $G_{0,1}$, $G_{1,1}$, $G_{2,1}$, and $G_{3,1}$; carrier $22_3$ carries disk drives $G_{0,2}$, $G_{1,2}$, $G_{2,2}$, and $G_{3,2}$; carrier $22_4$ carries disk drives $G_{0,3}$, $G_{1,3}$, $G_{2,3}$, and $G_{3,3}$. It is also noted that only one disk on each carrier is connected to a one of the serial interconnects of a serial interconnect carrier card. Thus, disk drives $G_{0,0}$, $G_{1,0}$, $G_{2,0}$, and $G_{3,0}$; of carrier $22_1$ are connected to serial interconnects $12_{1a}$, $12_{2a}$, $12_{3a}$, $12_{4a}$, respectively, of interconnect control card 12a and also to serial interconnects $12_{1b}$, $12_{2b}$, $12_{3b}$, $12_{4b}$, respectively, of interconnect control card 12b; disk drives $G_{3,1}$, $G_{0,1}$, $G_{1,1}$, and $G_{2,1}$; of carrier $22_2$ are connected to serial interconnects $12_{2a}$, $12_{2a}$, $12_{3a}$, $12_{4a}$, respectively, of interconnect control card 12a and also to serial interconnects $12_{1b}$, $12_{2b}$, $12_{3b}$, $12_{4b}$, respectively, of interconnect control card 12b; disk drives $G_{2,2}$, $G_{3,2}$, $G_{0,2}$, and $G_{1,2}$; of carrier $22_3$ are connected to serial interconnects $12_{1a}$, $12_{2a}$, $12_{3a}$, $12_{4a}$, respectively, of interconnect control card 12a and also to serial interconnects $12_{1b}$, $12_{2b}$, $12_{3b}$, $12_{4b}$, respectively, of interconnect control card 12b; and, disk drives $G_{1,3}$, $G_{2,3}$, $G_{3,3}$, and $G_{0,3}$; of carrier 12d are connected to serial interconnects $12_{1a}$, $12_{2a}$, $12_{3a}$, $12_{4a}$, respectively, of interconnect control card 12a and also to serial interconnects $12_{1b}$, $12_{2b}$, $12_{3b}$, $12_{4b}$, respectively, of interconnect control card 12b. Further, a first RAID group includes disk drives $G_{0,0}$, $G_{0,1}$, $G_{0,2}$ and $G_{0,3}$, as shown in FIG. 3B; a second RAID group includes disk drives $G_{1,0}$, $G_{1,1}$, $G_{1,2}$ and $G_{1,3}$; a third RAID group includes disk drives $G_{2,0}$, $G_{2,1}$, $G_{2,2}$ and $G_{2,3}$; and a fourth RAID group includes disk drives $G_{3,0}$, $G_{3,1}$, $G_{3,2}$ and $G_{3,3}$.

It is noted that with the arrangement 10, each carrier is connected to all of the four serial interconnects whereas with the arrangements shown in FIGS. 1A, 1B and 2A and 2B, the midplanes carry only the one serial interconnect. Further, unlike the arrangements shown in FIGS. 1A, 1B and 2A, 2B, with the arrangement 10, the carrier has at most one member of any RAID group included on it, with no common elements, such as serial interconnect, connections, circuitry, etc. between the disk drives. The same is true for connections to the power supply distribution buses within the enclosure. The first example of the prior art violates both of these tenets, the second example separates the power and circuitry, but connects the disks together on a midplane with a common serial interconnect.

Figure 3C:
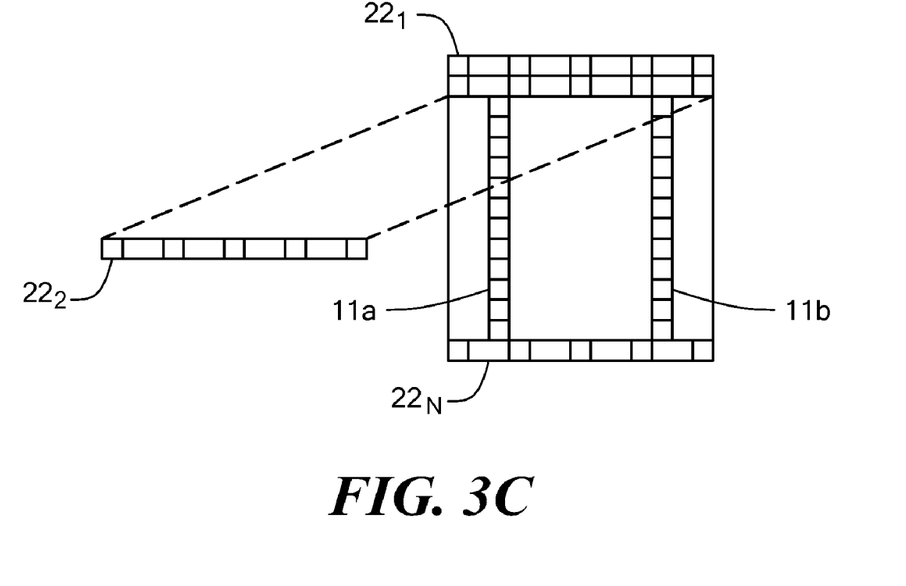
FIG. 3C is a diagram showing a cabinet for storing the disk drive arrangement of FIG. 3A.
Figure 3D:
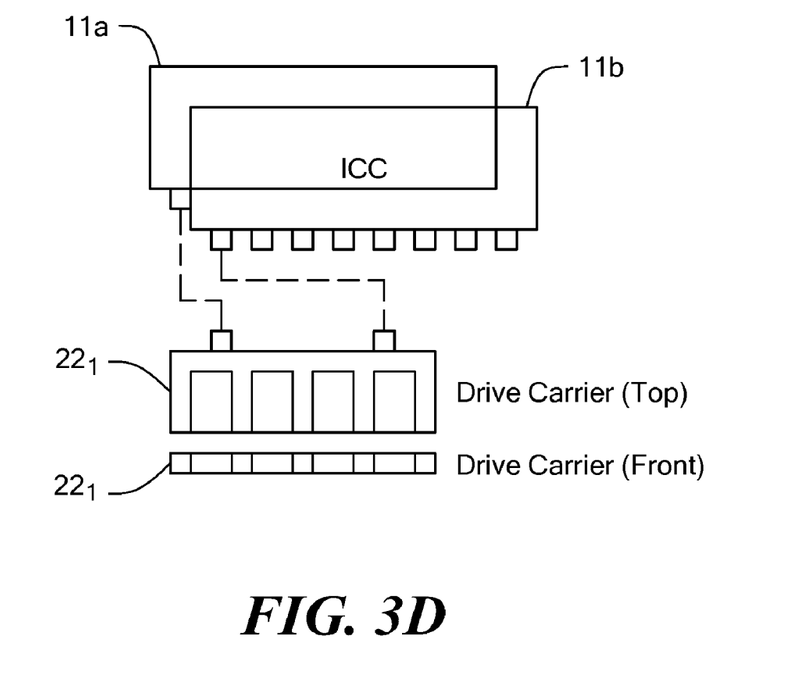
FIG. 3D is an assembly diagram of the arrangement of FIG. 3A.

FIG. 3C is a diagram showing a cabinet for storing the disk drive arrangement of FIG. 3A; and FIG. 3D is an assembly diagram of the arrangement of FIG. 3A.

A number of embodiments of the invention have been described. Nevertheless, it will be understood that various modifications may be made without departing from the spirit and scope of the invention. For example, while four disk drives per carrier has been described, it shown be understood that more or less than four disk drives may be on each carrier with a corresponding increase or decrease, as the case may be, in the number of serial interconnects per LCC. Accordingly, other embodiments are within the scope of the following claims.

What is claimed is:

1. An arrangement of a plurality of M×N disk drives, where M is an integer greater than 1 and N is an integer greater than 1, comprising:
    (A) an interconnect control card having a plurality of, N, serial interconnects, each one of the serial interconnects comprising a plurality of, M, serially connected switches;
    (B) a plurality of, M, disk drive carriers, each one of such disk drive carriers having thereon a different portion, N, of the plurality of M×N disk drives;
    (C) wherein the N disk drives on each one of the M carriers are connected to switches in a different one of the plurality of N serial interconnects.

2. The arrangement recited in claim 1 wherein disk drives on different ones of the carriers provide a RAID group.

3. An arrangement of a plurality of M×N disk drives, where M is an integer greater than 1 and N is an integer greater than 1, comprising:
    (A) an interconnect control card having:
        a plurality of, N, serial interconnects, each one of the serial interconnects comprising a plurality of, M, serially connected switches, each one of such switches having a disk drive port; and
        a plurality of M×N interconnect control card ports, each one of the interconnect control card ports being connected to the disk drive port of a
    (B) a plurality of, M, disk drive carriers, each one of such disk drive carriers having thereon:
        a different portion N of the plurality of M×N disk drives;
        a plurality of M×N carrier ports;
        wherein each one of the plurality of carrier ports is connected to a corresponding one of the interconnect control card ports; and
    (C) wherein the carrier ports on each one of the carriers are connected to the disk drive ports connected to the switches in a different one of the serial interconnects.

4. The arrangement recited in claim 3 wherein disk drives on different ones of the carriers provide a RAID group.

5. An arrangement of a plurality of M×N disk drives, where M is an integer greater than 1 and N is an integer greater than 1, comprising:
    (A) a first interconnect control card having a plurality of N first serial interconnects, each one of the first serial interconnects comprising a plurality of M serially connected first switches;
    (B) a second interconnect control card having a plurality of N second serial interconnects, each one of the second serial interconnects comprising a plurality of M serially connected second switches;
    (C) a plurality of disk drive carriers M, each one of such disk drive carriers having thereon a different portion N of the plurality of M×N disk drives;
    (D) wherein the disk drives on each one of the carriers are connected to the switches in a different one of the plurality of first serial interconnects and in a different one of the plurality of second serial interconnects.

6. The arrangement recited in claim 5 wherein disk drives on different ones of the carriers provide a RAID group.

7. An arrangement of a plurality of M×N disk drives, where M is an integer greater than 1 and N is an integer greater than 1, comprising:
    (A) a first interconnect control card having:
        a plurality of N first serial interconnects, each one of the first serial interconnects comprising a plurality of M serially connected first switches, each one of such first switches having a first disk drive port; and
        a plurality of M first interconnect control card ports, each one of the first interconnect control card ports being connected to the first disk drive port of a corresponding one of the first switches,
    (B) a second interconnect control card having:
        a plurality of N second serial interconnects, each one of the second serial interconnects comprising a plurality of M serially connected second switches, each one of such second switches having a second disk drive port; and
        a plurality of second interconnect control card ports M, each one of the second interconnect control card ports being connected to the second disk drive port of a corresponding one of the second switches,
    (C) a plurality of M disk drive carriers, each one of such disk drive carriers having thereon:
        a different portion N of the plurality of M×N disk drives;
        a plurality of M carrier ports;
        wherein each one of the plurality of carrier ports is connected to a corresponding one of the first interconnect control card ports and the second interconnect control card ports; and
    (D) wherein the carrier ports on each one of the carriers are connected to the first disk drive ports connected to the first switches in a different one of the first serial interconnects and to the second disk drive ports connected to the second switches in a different one of the second serial interconnects.

8. The arrangement recited in claim 7 wherein disk drives on different ones of the carriers provide a RAID group.

9. A disk drive interconnect arrangement comprising:
a plurality of serial interconnects, each one of the serial interconnects comprising a plurality of serially connected switches;
a plurality of disk drive sections, each one of the disk drive section comprising a plurality of disk drives;
wherein in each one of the disk drive section, each one of the disk drives is coupled to one of the switches in a different one of the plurality of serial interconnects.

10. The arrangement recited in claim 9 wherein the disk drives connected to switches in different ones of the plurality of serial interconnects form a RAID group.

11. A disk drive interconnect arrangement comprising:
a plurality of serial interconnects, each one of the serial interconnects comprising a plurality of serially connected switches;
a plurality of disk drive sections, each one of the disk drive section comprising a plurality of disk drives;
wherein in each one of the disk drive section, each one of the disk drives is coupled to one of the switches in different ones of the plurality of serial interconnects to form a corresponding one of a plurality of RAID groups;
and wherein disk drives on different ones of the carriers provide one of said plurality of RAID groups.

12. A disk drive interconnect arrangement comprising:
a first plurality of serial interconnects, each one of the serial interconnects comprising a plurality of serially connected switches;
a plurality of disk drive sections, each one of the disk drive section comprising a plurality of disk drives, each one of the disk drives having a pair of ports;
a second plurality of serial interconnects, each one of the serial interconnects comprising a plurality of serially connected switches;
wherein in each one of the disk drive section, each one of the disk drives has one of the pair of ports coupled to one of the switches in a different one of the first plurality of serial interconnects and the other one of the pair of ports coupled to one of the switches in a different one of the second plurality of serial interconnects.

* * * * *